(12) United States Patent
Hsu

(10) Patent No.: US 6,734,394 B2
(45) Date of Patent: May 11, 2004

(54) ELECTRIC ARC WELDER AND CONTROLLER TO DUPLICATE A KNOWN WAVEFORM THEREOF

(75) Inventor: Christopher Hsu, Mentor, OH (US)

(73) Assignee: Lincoln Global, Inc., Monterey Park, CA (US)

(*) Notice: Subject to any disclaimer, the term of this patent is extended or adjusted under 35 U.S.C. 154(b) by 15 days.

(21) Appl. No.: 10/252,691

(22) Filed: Sep. 24, 2002

(65) Prior Publication Data

US 2003/0071026 A1 Apr. 17, 2003

Related U.S. Application Data

(60) Provisional application No. 60/328,581, filed on Oct. 12, 2001.

(51) Int. Cl.[7] .............................................. B23K 9/09
(52) U.S. Cl. .............................. 219/137 PS; 219/130.51
(58) Field of Search ....................... 219/137 PS, 130.5, 219/130.51, 130.21, 130.31, 130.32, 130.33

(56) References Cited

U.S. PATENT DOCUMENTS

| 5,278,390 A | 1/1994 | Blankenship |
| 6,002,104 A | 12/1999 | Hsu |

*Primary Examiner*—Clifford C. Shaw
(74) *Attorney, Agent, or Firm*—Fay, Sharpe, Fagan, Minnich & McKee

(57) ABSTRACT

A system for creating an actual waveform at the output of an electric arc welder and caused by a waveform generator where the welder has a display and customizing screen to design a commanded waveform for processing by the waveform generator. The system includes a program to display a target waveform on the screen, a program to display the commanded waveform on the screen, a computer terminal to manually customize the commanded waveform to generally match the target waveform controlling the waveform generator to cause the actual waveform produced by the welder to match with the target waveform.

23 Claims, 7 Drawing Sheets

US 6,734,394 B2

ELECTRIC ARC WELDER AND CONTROLLER TO DUPLICATE A KNOWN WAVEFORM THEREOF

This application claims priority of now abandoned U.S. Provisional Application Ser. No. 60/328,581, filed Oct. 12, 2001.

The present invention relates to the art of electric arc welding with a welder having a power supply of the switching type and more particularly to an electric arc welder of this type combined with a novel and unique controller to design the waveform.

BACKGROUND OF INVENTION AND INCORPORATION BY REFERENCE

Electric arc welding involves the movement of an electrode toward a workpiece while current is passed through the electrode and across an arc between the electrode and workpiece. Although some electric arc welders utilize a non-consumable electrode, most of the mass production arc welding involves an electrode which is consumed during the welding process whereby the electrode is melted by the arc and deposited on the workpiece. Thus, an arc welding process includes variable process characteristics, such as wire speed or electrode speed, gas composition, electrode diameter and workpiece metal. The actual electrical arc welding process at the production site takes into consideration these characteristics and involves a non-linear complex control system which determines the applicable metal transfer mode and the electrical parameters of the power supply performing the welding process. In order to achieve desirable results, a waveform is selected having several control parameters, which waveform is customized for the exact condition of each welding application. Thus, controlling arc welding has become an art which demands substantial knowledge and experience to select a waveform having several control parameters to produce an optimum welding process. A large number of controllers have been developed for use with electric arc welders that have real time current waveforms developed by welding engineers to optimize the welding process performed in the field. To accomplish this objective, a microprocessor based controller has been developed and is now used that allows an operator in the field to select one of many welding waveforms by merely using one of several overlays. This successful microprocessor based controller is illustrated in Blankenship U.S. Pat. No. 5,278,390 that is incorporated by reference herein. By using a known template for the controller, an operator selects a welding waveform having the desired control parameters especially developed for the selected weld process by a skilled welding engineer. This successful controller had a certain amount of adjustability in the field; however, such on-site adjustments were limited. Mass production use of arc welders has created a demand for the ability to conveniently adjust certain control parameters of the welding waveform in the field, especially when the welding process conditions are different than what is used in designing standard waveforms shipped with the welders (such as cable length, shielding gas and welding wire). Thus, there was a need for a controller to be used with an electric arc welder, where the controller can process a desired waveform that is adjusted interactively at the manufacturing site so the waveform is optimized for welding conditions and welding requirements for the job.

To fill this need, an electric arc welder was developed with a microprocessor based controller for the specific arc welder. This welder is shown in Hsu U.S. Pat. No. 6,002,104 incorporated by reference herein. The welder has a switching type power supply for creating a welding cycle, with a real time current waveform constituting several control parameters by rapidly switching a D.C. current in a controlled fashion by a pulse width modulator and it will be described with respect to such switching type power supply. This prior patented controller was used with various switching type power supplies normally used in electric arc welders; however, the Hsu patent shows a down chopper power supply for simplicity. In practice, an inverter type power supply having a waveform controlled by a pulse width modulator was controlled in accordance with the present invention. The microprocessor based controller included means for displaying a waveform generated on an electrically operated waveform screen, such as a CRT. In this manner, the operator at the production site viewed the actual waveform to be processed by the electric arc welder under the direction of the patented controller. Interactive means were employed for manually adjusting at least a portion of the waveform displayed on the waveform screen to generate a new waveform operating on the waveform screen and having the desired control parameters. Consequently, a prebuilt waveform was first displayed on the CRT, normally in a graph exhibiting current versus time. To change one of the control parameters, such as background current, peak current, current ramp, etc., a manual adjustment of the prebuilt waveform was performed manually and interactively on the waveform screen. In this manner, a new current waveform was exhibited on the waveform CRT screen. In accordance with somewhat standard practice, before the patented arc welder the pulse width modulator of the power supply was controlled in accordance with the newly created current waveform to cause the power supply itself to generate a welding cycle with the real time waveform corresponding to the new waveform on the waveform screen. The welder power supply executed the new control parameters exhibited as control parameters in the new waveform. In this manner, a desired waveform was exhibited and used by the electric arc welder. If there was a need to change a control parameter of the exhibited waveform, the waveform itself was modified visually by the operator on site and then employed for control of the electric arc welder. This interactive changing of the waveform, as it was visually displayed on a waveform screen, was novel to the welding field and was implemented by including a JAVA virtual machine with a welder control application program or an applet running within a browser in JAVA language. The JAVA control program was dedicated to the specific electric arc welder combined with the controller. Thus, the consumer product was an electric arc welder having a power supply with a microprocessor based controller that was driven by a program in JAVA language. This concept was accomplished by using a JAVA virtual machine as part of the on site controller. This new electric arc welding was interactively manipulated to create a waveform for controlling the actual real time waveform of the welding process. The controller performed its functions through real time adjustment of the pulse width modulator used in the switching power supply driving the welder.

In a welder using the patented technology of Hsu U.S. Pat. No. 6,002,104 the welder has a microprocessor with a JAVA virtual machine and controlled by at least one control application program in JAVA language. The program was dedicated to the particular welder being controlled. The microprocessor system included hardware with a first interface for an interactive display screen and a second interface for a manual data entry device, such as mouse or keyboard, that was used interactively to change the waveform on the display screen preparatory to the waveform being implemented on a digital communication link (such as ethernet or infrared) for outputting control parameters to the welder. The same communication channel was used to input operating parameters from the welder. In this manner, the electric welder was controlled by manual manipulation of the actual waveform to be used in the welding process preparatory to implementation of the welding process. As changes are required, certain control parameters were adjusted on the display screen to merely change the shape of the waveform being displayed. When the operating parameters from the welder were inputted to the microprocessor of the controller, a separate "scope" application program in JAVA language was selected and implemented by the controller. In this manner, the CRT of the controller was converted from a waveform editor to an oscilloscope display for reading parameters from the welder and for displaying these parameters as a soft oscilloscope on the face of the controller. The scope display used a window separate and distinct from the window used for editing the waveform. The screen of the controller was used to display either the waveform processed by the waveform editor application program or the oscilloscope plots processed by the scope application program. Both programs were processed by the JAVA virtual machine which was a part of the welder. The application programs were loaded into the virtual machine by a CD ROM that is loaded at the factory to program each of the welders preparatory to delivery. The physical media of distributing the JAVA object code or bytecode from the welding manufacturer to the customer used other forms, such as a floppy diskette, E-mail, web page and down loading by a modem. To change the operation program for the welders in the field, the patented welder periodically updated the control application program and/or the scope application program of the welders by a new CD ROM or by an Internet feed.

The patented controller of Hsu U.S. Pat. No. 6,002,104 displayed on its screen a waveform series of read out devices adjacent the waveform screen. A series of control parameters for the waveform were displayed adjacent the waveform screen, as read out values. The waveform was displayed on the waveform screen and contained a series of control parameters, some of which were recorded as read out values on the face of the controller adjacent the waveform screen. This total display is shown in FIG. 2 and is referred to as the graphic user interface or GUI. This display is used interactively to modify the waveform. The variable tables and waveform logic is provided by the memory stack as shown in FIG. 4. As an example of the display usage, the peak current of the waveform is displayed in an alpha numerical numbers on the face of the controller. As the waveform was modified interactively on the screen, the read out value was automatically changed accordingly. In addition, by adjusting one or more of the displayed control parameters at the read out device, the waveform itself was changed accordingly. The displayed control parameters, shown in the read out devices, had corresponding lock control parameter means for manually locking the display control parameters at preselected read out values. In this manner, the waveform was adjusted to change the value of a locked out control parameter. The prior art controller included a first override that was implemented to limit the value of one or more of the control parameters. In other words, if maximum current of the welder was at a set point, the control program processing a given waveform would prevent adjustment, either interactively or by a read out device, of the current to a level above the set maximum level. The same concept was used with a relational constraint wherein there is a fixed relationship of one control parameter to another control parameter. This fixed relationship was maintained. In this fashion, when one of the control parameters was adjusted, the other parameter is adjusted accordingly to maintain the set, fixed relationship. These are schemes utilized in the prior art patented welder to constrain the interactive manipulation of the waveform on the waveform screen or adjustment of the waveform through read out devices on the face of the controller. The JAVA virtual machine of the prior controller is provided with two or more application programs that are stand alone and can be selected by the operator who selects one or the other programs to be executed. The hardware of the controller includes a mouse or keyboard which latches onto certain points on the displayed waveform and allows the points to be moved or dragged in accordance with standard microprocessor operation. Consequently, there were graphically manipulating current waveforms for an arc welder in real time using JAVA technology. The welder monitors the actual waveform of the welder by analyzing operating parameters and using measurable electrical signals, such as arc current and voltage, derivative signals, such as impedance, power and energy, and process modes of operation. By using this concept, the operating signals or parameters from the welder itself were used to display and apply impedance of the arc and cable and instantaneous power of the arc and cable. Average current and voltage are sampled at a fixed rate and the welding time and the accumulated energy were also capable of being displayed in real time. If the optional scope program was employed, the output waveform created on the screen was analyzed and numerical data was displayed from various aspects of the displayed operating parameters. Other aspects of the actual operating condition of the welder were displayed and analyzed by using the scope program of the controller, not forming a part of the present invention.

In the prior art electric arc welder patented in Hsu U.S. Pat. No. 6,002,104, the processing logic was fixed and inflexible so that only certain types of waveforms pre-built into the program could be processed. For instance, a fixed wave shape template was selected for display and manipulation. See FIG. 3. The basic aspects of the template were fixed logic. Thus, the welder with a JAVA virtual machine could only select fixed templates for processing of specific current waveforms. There was no ability to select from a memory location certain data and display this as a waveform in a manner to change the behavior of the waveform template. In the prior art unit, the weld program compiled as object code or bytecodes was fixed to manipulate a fixed waveform logic of FIG. 4. If the waveform in FIG. 4 is changed, the JAVA source code must be changed to support the new waveform logic.

THE INVENTION

In electric arc welding, it has become well known to use a waveform generator to create an output waveform in an electric arc welder of the type driven by a high speed switching power supply, such as an inverter. In these welders, a welding engineer, or other skilled personnel, must load the values of the parameters and/or states into a state table or stack that is partitioned into work points, such as wire feed rates. By using a knob, a particular work point or wire feed speed is selected so that the state table controls the waveform generator by a commanded waveform with values and states that have been preprogrammed for a given work point. In Blankenship U.S. Pat. No. 2,578,390, this type of power supply is disclosed with a user interface for customizing the selected waveform to be used in the welder. An operator selects the desired waveform by manually or otherwise selecting the work point. Then, the waveform is displayed on a screen or CRT where it may be manually customized within certain internally provided constraints and relationships. To show this background information, Blankenship U.S. Pat. No. 5,278,390 and Hsu U.S. Pat. No. 6,002,104 are incorporated by reference herein.

In accordance with the present invention, a system and method is provided to duplicate a known recorded wave form from another power supply. For instance, if a welding facility desires to repeat the exact customized waveform from one STT welding machine to a second machine as shown in Blankenship U.S. Pat. No. 5,278,390, the present invention is used. In accordance with the invention, a desired target waveform is superimposed upon the same screen as the commanded waveform under development by the welding engineer. In practice this is done in two different colors. The welding engineer then drags and stretches the commanded waveform until it fits the superimposed target waveform. This is accomplished by a customizing procedure well known in the field and shown specifically in Hsu U.S. Pat. No. 6,002,104. Then, the welder is operated in accordance with the previously adopted waveform from another power supply. As an option, the actual waveform produced by the commanded, customized waveform is superimposed on the screen, whereby the difference between the actual waveform under development is matched to the target waveform to be duplicated. Thus, the target waveform is displayed with the commanded waveform. The actual waveform from the welder is sensed and transmitted back to the screen to be matched with the target waveform. This allows further customizing of the waveform to control and change any minor waveform differences. After this process has been done by the welding engineer, the new welder is loaded with the customized waveform as the commanded waveform control of the waveform generator. This commanded waveform is for a given work point, many of which will be available from the work point stack of the memory used in the controller of the welder. In practice, this method and system is automated by a software algorithm that manipulates the commanded waveform so that the differences between the actual waveform and the targeted waveform are minimized. This automatic customizing method and system is selected by an operator after the desired target waveform is displayed on the screen or is stored in memory in the controller. Consequently, in the automated implementation of the present invention, the display screen is not necessary.

The waveforms discussed herein are digitized and capable of being stored in the memory stack for each work point to be selected and displayed in the graphic user interface for customization. The digitized waveform to be copied is loaded into memory and then optically displayed on the CRT screen with the commanded waveform from the state table for a particular addressed work point.

Referring in more detail to the invention, a system is provided for creating an actual waveform at the output of an electric arc welder that is caused by a waveform generator. The welder has a display and customizing screen to design a commanded waveform for processing by the waveform generator. The system includes a program to display a target waveform on the screen. In practice, the waveforms are digitized and stored in memory. Another subroutine in the program is used to display the commanded waveform on the screen at the same time as the screen displays the target waveform. A computer terminal is used to manually customize the commanded waveform to generally match the target waveform. This system includes a pulse width modulator to cause the actual waveform to duplicate the commanded waveform directed to and controlling the operation of the waveform generator.

In accordance with another aspect of the invention, the actual waveform from the welder is digitized and displayed so that the actual waveform can be compared with the target waveform and customized so that the actual waveform matches the target waveform. Thus, the actual waveform is used to customize the commanded waveform for use in the waveform generator of the welder. In the invention, the waveforms are digitized and stored in memory for processing by the waveform editor or graphic user interface. In the preferred embodiment, the target waveform is an actual waveform of a remote welder so that the commanded waveform in the welder controlled by the invention matches either the commanded waveform of the remote welder or the actual waveform of the remote welder. It is more convenient to use the digitized commanded waveform of the remote welder instead of the actual waveform. This digitized data is easily obtainable from the controller of the remote welder.

In accordance with another aspect of the present invention, there is provided a method for creating an actual waveform at the output of an electric arc welder, which waveform is caused by a waveform generator. The welder is standard and includes a program for displaying a specific commanded waveform for use in controlling the waveform generator. This method comprises loading a target waveform into memory for processing by the program. A commanded waveform is stored in memory. The two stored digitized waveforms are then used to customize the commanded waveform to match the stored target waveform. Then, the customized commanded waveform is directed to the waveform generator to cause operation of the welder in a manner to produce a welding process having an actual waveform. This actual waveform matches the targeted waveform which is, in practice, a digitized commanded waveform from a remote welder.

The primary object of the present invention is the provision of a system and method for creating an actual waveform at the output of an electric arc welder, which waveform is caused by a standard waveform generator and wherein the actual waveform matches a desired target waveform from a remote welder.

Still a further object of the present invention is the provision of a system and method, as defined above, which system and method utilizes a standard graphic user interface to customize the commanded waveform to match the target waveform.

Still a further object of the present invention is the provision of a system and method, as defined above, which system and method can be easily implemented by a standard digital signal processor of an electric arc welder.

Yet a further object of the present invention is the provision of a system and method, as defined above, which system and method allows a welder to be operated in accordance with the desired waveform from a remotely located welder. Furthermore, this customizing capability can be trimmed by use of the actual waveform from the welder being controlled whereby the welder operates in accordance with the same waveform as the remote welder.

These and other objects and advantages will become apparent from the following description taken together with the accompanying drawings.

PREFERRED EMBODIMENT OF THE INVENTION

Figure 1:
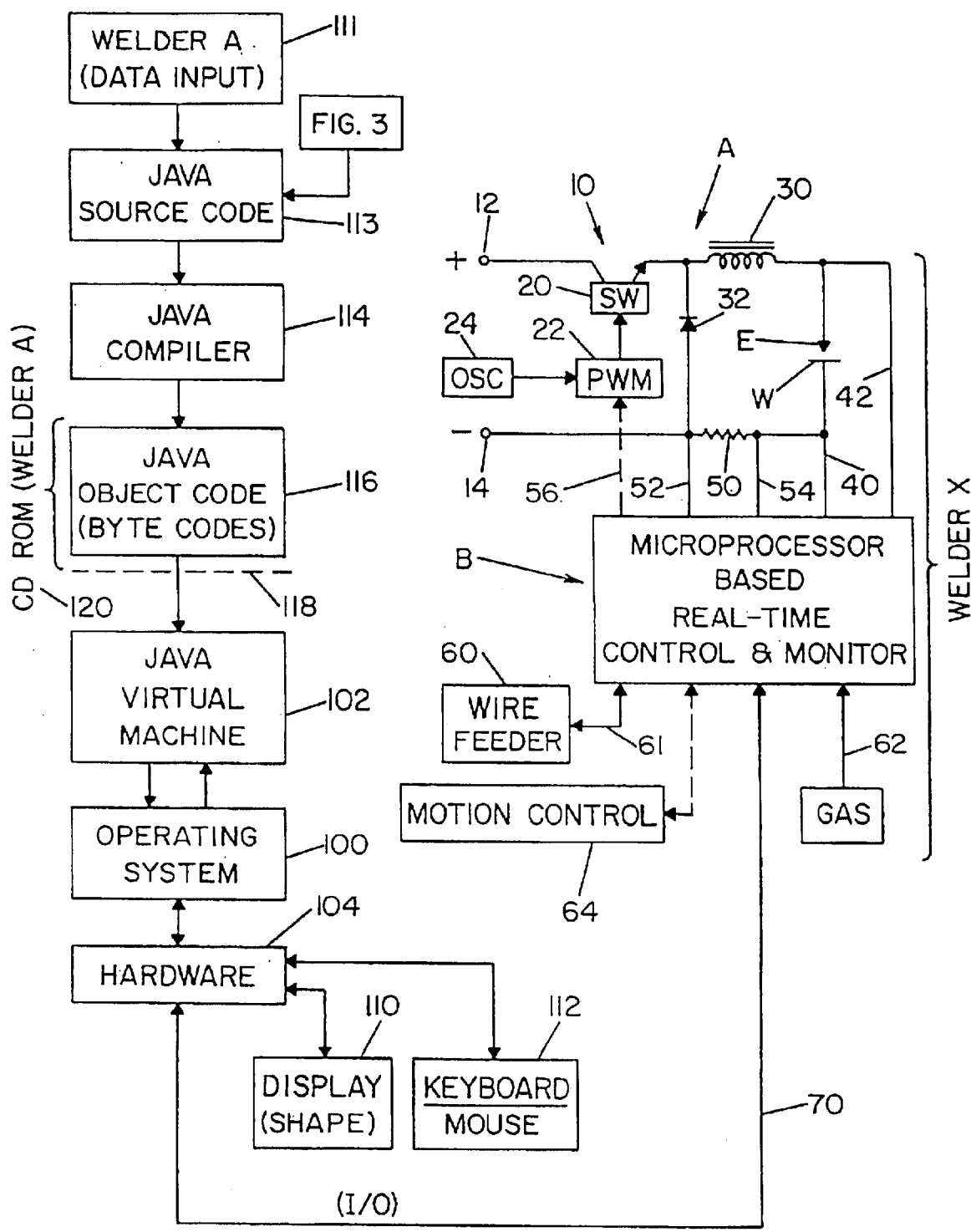
FIG. 1 is a control architecture of a controller and electric arc welder with a stand alone implementation of JAVA technology as disclosed in Hsu U.S. Pat. No. 6,002,104 and used for practicing the preferred embodiment of the present invention.

Referring now to the drawings, wherein the showings are for the purpose of illustrating the preferred embodiment of the present invention and not for the purpose of limiting same, FIG. 1 shows the prior art of Hsu U.S. Pat. No. 6,002,104. An electric arc welder A controlled by a somewhat standard microprocessor based controller B which is a real time control and monitor for welder A. Controller B is combined with welder A as a commercial product purchased for use in various welding processes, especially for mass production welding of consumer products, which welding is often done by a robot. The stand alone unit incorporating welder A and controller B uses any of a number of switching type power supplies, such as an inverter generally illustrated in Blankenship U.S. Pat. No. 5,349,157 or a buck converter or down chopper as generally shown in Stava U.S. Pat. No. 4,952,064. For the purposes of simplicity, welder A is shown as including a down chopper as part of power supply 10 which is used to switch a D.C. current at terminals 12, 14 in accordance with the operation of a switch 20. In practice, an inverter or a buck converter is used with a plurality of switches or switches arranged in various configurations. A simplified switching type power supply utilizes switch 20 controlled by a pulse width modulator 22 driven at a pulse rate determined by oscillator 24, which pulse rate is normally 10 to 20 kHz and preferably approximately 20 kHz. Current pulses occur at a rapid rate and are directed through a relatively small inductor 30 to perform a welding process implemented between electrode E, normally in the form of an advancing welding wire, and workpiece W. The duty cycle of the various pulses of switch 20 is controlled by pulse width modulator 22 so that the waveform of the current in the welding process between electrode E and workpiece W is accurately controlled and repeated consistently. In accordance with standard practice, welder A has a freewheeling diode 32, an arc voltage sensor for creating a voltage across lines 40, 42 and a current shunt 50 for creating a voltage across lines 52, 54 representative of the arc current. The voltages across lines 40, 42 and lines 52, 54 are directed to the input of controller B for the purpose of monitoring the welding process, which process is controlled by the voltage on line 56 that changes in a real time fashion to follow the shape of a waveform governing the welding cycle of welder A. In accordance with standard practice, electrode E is an advancing welding wire represented as a wire feed device 60 having a speed controlled by and monitored by controller B as indicated by line 61 or a fixed electrode is used, such as TIG welding. The welding process performed by welder A is modified according to the shielding gas employed in the welding process. The shielding gas is identified by data on line 62. When welder A is used for an automatic welding processes, such as robotic processes, the welding head is moved on a real time basis in accordance with a program in controller B that operates motion control device 64 in accordance with standard practice. The present invention relates to the control of welder A during the welding process. In the prior art, the control was not necessarily to the individual control of orientational coordinates of the welding gun and the speed of the movement of the welding gun as schematically illustrated by motion control 64. As so far described, welder A is standard and controller B is a device well known in the art and known to manufacturers of electric arc welders having microprocessor based controllers. One such controller is generally illustrated in Blankenship U.S. Pat. No. 5,278,390. The command signal on line 56 is analog; however, in the invention, the command signal to control the shape of the waveform is either analog or digital format.

The power supply is shown as having a single polarity. By adding a second output network, the weld process is in two polarities, i.e. positive and negative. See Stava U.S. Pat. Nos. 6,111,216; Stava 6,207,929; and Stava 6,291,798, incorporated by reference herein.

Controller B is operated by the logic on I/O conduit or digital communication link 70, which logic is the control parameters inputted into the controller. This same link outputs data or operating parameters from controller B. These control and operating parameters are processed in accordance with a software operating system 100 that may have any platform configuration with JAVA virtual machine 102. In Hsu U.S. Pat. No. 6,002,104 the virtual machine is loaded with one or more JAVA application programs for performing the waveform editing as hereinafter described. Hardware 104 interacts with display 110 and is controlled by manual data entry device 112 in the form of a keyboard or mouse. As so far described, the total product of welder A and controller B, with real time control and monitoring of the welder by JAVA technology, is disclosed in Hsu U.S. Pat. No. 6,002,104. Waveforms exhibited on interactive display 110 are modified by manual data entry device 112 to create a new waveform to generate the desired control parameters on link 70 for real time control of the welding process between electrode E and workpiece W. The control parameters control the welding process in accordance with the final waveform; however, visual display 110 plots the real time operating parameters of the welding process. Thus, controller B monitors the ongoing welding process dictated by waveform ultimated selected by the control application program loaded in virtual machine 102. In practice, display 110 and manual data entry device 112 are adjacent welder A; however, link 70 can be a remote communication line.

Figure 3:
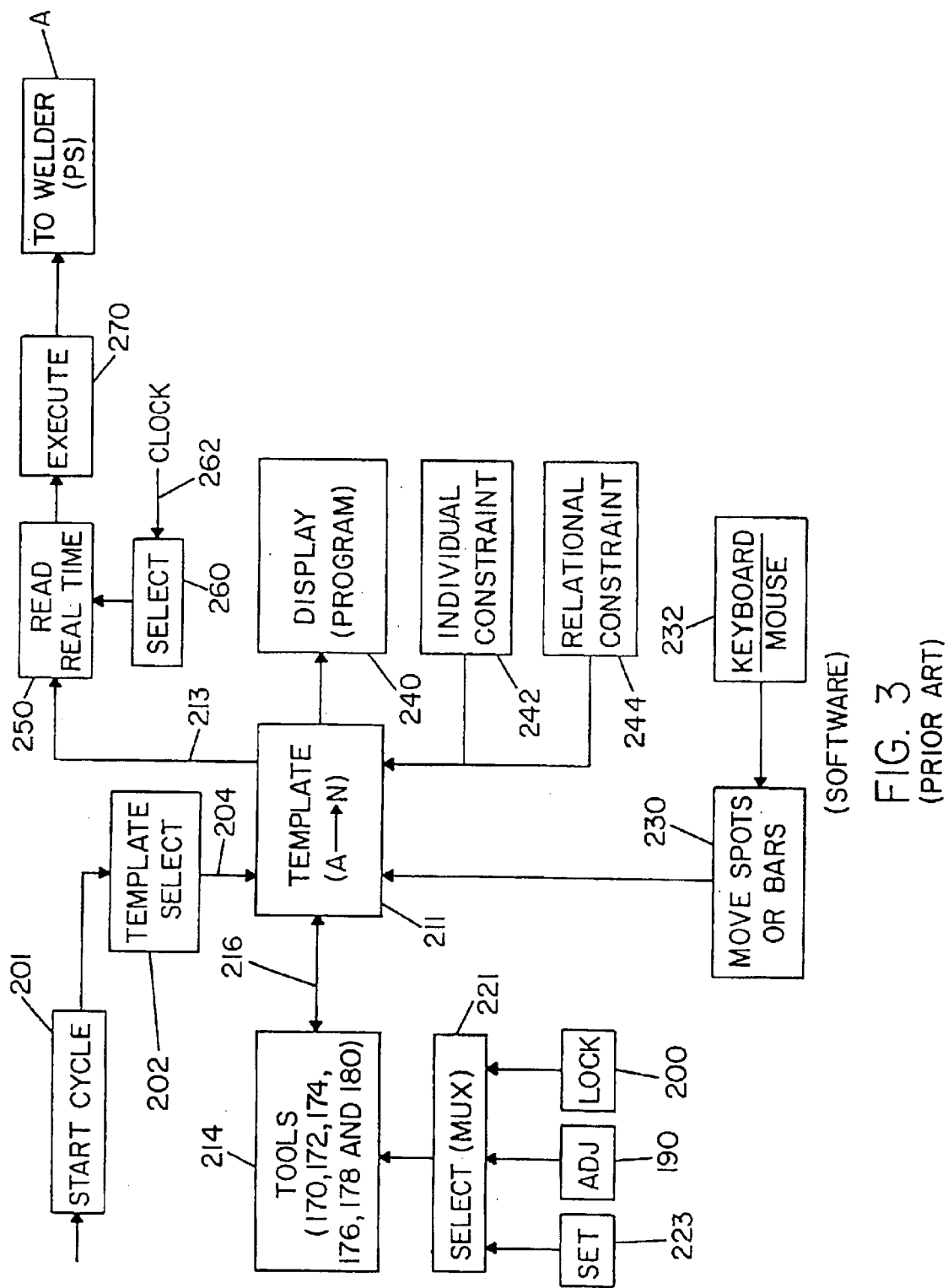
FIG. 3 is a functional block diagram of the control application program implemented by JAVA language and dedicated to a particular welder which program is used to program the architecture shown in FIG. 1 of the prior art electric arc welder.

JAVA virtual machine 102 is provided with a generic program. Data input indicated by block 111 has data that relates to welder A and is converted to JAVA source code, as indicated by block 113 which is predesigned. JAVA source code from block 113 is sent to compiler 114 to produce data in block 116 as bytecodes. The control program shown in FIG. 3 is also in JAVA language whereby the JAVA source code of the control program and the data specific to welder A are compiled and converted into bytecodes as indicated at block 116. This programming procedure is well known in the art and can be accomplished by persons in the welding Industry to create a stand alone welder and controller having a JAVA virtual machine for implementing the unique control program. Compiler 114 compiles the source codes of block 113 into bytecodes at block 116 for use by virtual machine 102. The CD ROM implementation 120 of the program of block 116 for the particular welder A is preferred; however, a tape or internet 118 could be used to load application programs into virtual machine 102. Welder A and controller B are commercial products, sold in the welding industry as a stand alone units which are programmed by an appropriate device, in practice a CD ROM containing bytecodes for application programs in JAVA language, such as an operating program illustrated in FIG. 3.

Figure 2:
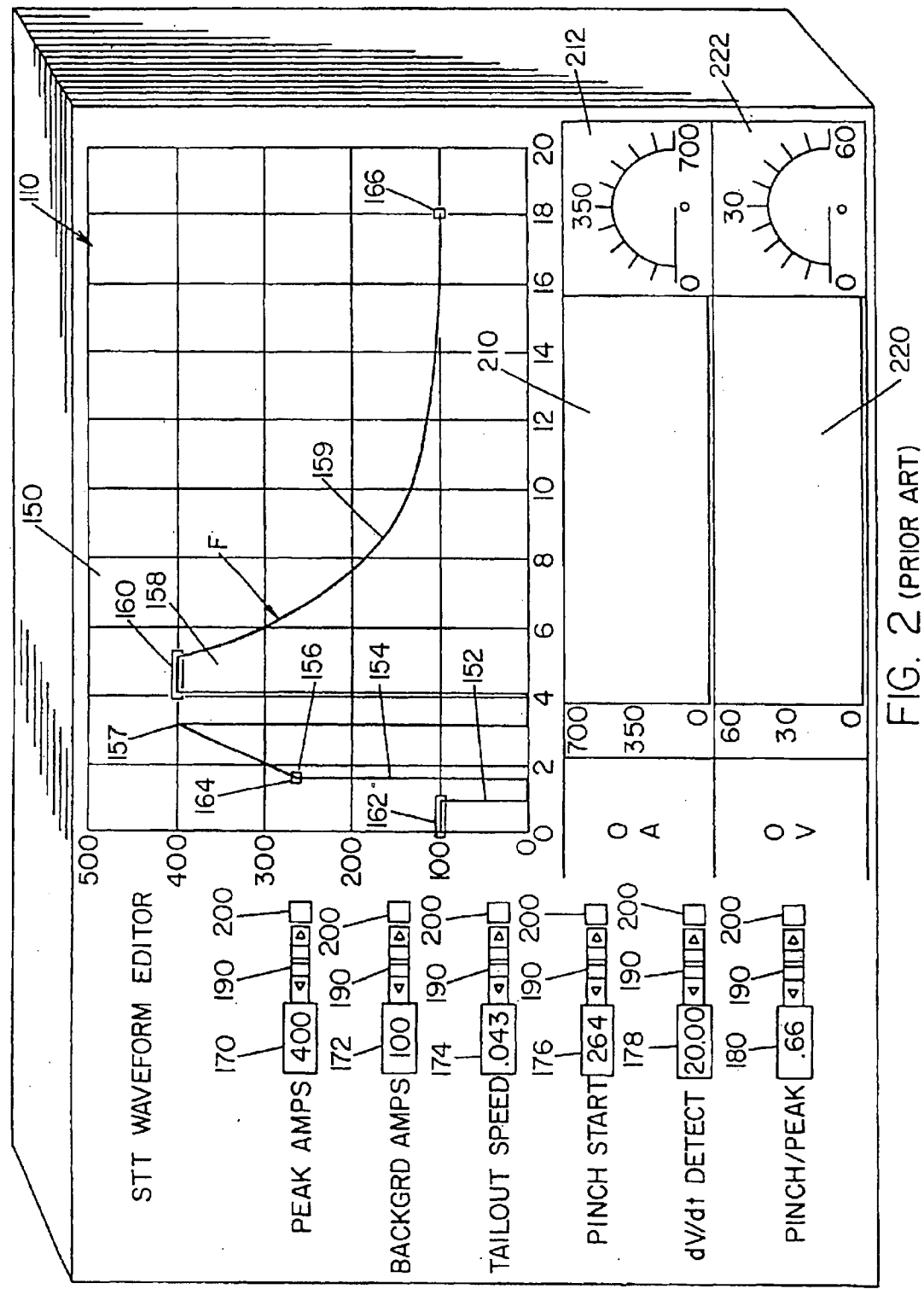
FIG. 2 is a front view of the CRT screen or graphic user interface showing the waveform and other visual devices when the controller is used to implement the script language program, which front view does not differ from the prior art shown in Hsu U.S. Pat. No. 6,002,104.

Operation of controller B to implement the control application program is illustrated in FIGS. 2 and 3. FIG. 2 shows interactive display 110 used for editing a waveform F to be used to generate the control parameters used for operation of the power supply of welder A to duplicate waveform F. Visually displayed on waveform screen 150 of interactive display 110 is waveform F. This waveform is processed by welder A. The illustrated waveform is a short circuit welding operation similar to the STT welding process where a short between the molten metal ball on electrode E and workpiece W is detected by a drop in voltage at 152. Then, the current is allowed to flow through the shorted metal, as indicated by line 154. An electrical pinch starts at point 156, which is shown as 264 amperes. At point 157 a dv/dt detector indicates an imminent rupture of the fuse (short). The current is then turned off for a short period of time and is then allowed to have a plasma boost 158 with a tailout along curve 159 awaiting the next short of the molten ball created by the arc of plasma after the fuse. Waveform F is representative in nature and is used by controller B to operate pulse width modulator 22 to follow waveform F during the welding process. Other waveforms on screen 150 can be implemented by welder A in the same manner. Persons skilled in arc welding would know how the variables are to be set.

Waveform F has a prebuilt or initial configuration when it is initially displayed on screen 150 of interactive display 110. The displayed waveform has certain portions which can be interactively moved. In this particular waveform, the peak current of the plasma boost is represented by a vertically movable bar 160. Background current of waveform W also has a vertically movable bar 162. Manual data entry device 112 allows an operator to select either of these bars by a mouse or keyboard and move the bars up or down. This action changes waveform F from the original prebuilt template by changing the current levels of the peak current 160 or the background current 162. In this particular example, waveform F also has two movable points 164 and 166 which can be moved vertically and horizontally, respectively. By interactively moving point 164, the current starting point for the pinch current is changed. In a like manner, moving point 166 left or right changes the tail out 159 of waveform F. Manipulation by a mouse to change either the level of bars 160, 162 or points 164, 166 modifies waveform F before the waveform is implemented in real time by controller B at welder A. Another waveform used for a different welding process would have different spots to be moved or bars to be raised or lowered. A prebuilt template is initially displayed on screen 150. Then the waveform is modified by moving the bars and changing the points to produce a similar waveform with different control parameters modified to create the desired waveform for use in the real time operation at welder A. The patented welder of Hsu U.S. Pat. No. 6,002,104 and the present invention both display a waveform to be used by controller B to direct operation of welder A. The waveform is visually edited or modified by merely interactively moving points and bars on the waveform to change the control parameter directed to bus 70 for control of welder A.

Interactive display 110 is provided with a number of read out devices or tools to also change control parameters of the displayed waveform F. The read out devices contain values given in alpha numerical numbers illustrated as peak amperes in read out device or window 170, background amperes in device or window 172, tail out speed in device or window 174, pinch start in device or window 176, dv/dt detect in device or window 178 and a relationship between the pinch current at point 164 and peak current bar 160 in device 180. Read out values in devices or windows 170, 172, 174, 176, 178 and 180 are the values for the displayed waveform F. As points 164, 166 are moved, the read out values change accordingly. The same is true of raising and lowering bars 160, 162. The tools or read out values in devices or windows 170, 172, 174, 176, 178 and 180 can be incrementally changed by associated scroll bars 190. If it is desired to lock a control parameter at a particular exhibited value in one of the devices or windows 170, 172, 174, 176, 178 and 180, the mouse activates a lock window 200 associated with the particular read out devices or tool. For instance, if the peak current is adjusted by scroll bar 190 to 400 amperes as is the maximum current desired for the waveform F, block 200 at window 170 is addressed by the mouse to lock the current at 400 amperes. The same operation is possible at the various tools. When a value displayed in a read out device or window 170, 172, 174, 176, 178 and 180 is a locked parameter, interactive manipulation of the points and bars on screen 150 cannot violate the constraints of the set value in the read out device. Interactive display 110 includes a graph 210 for a current plot together with an analog read out gauge 212. In a like manner, graph 220 plots the voltage level at the welding arc in a manner complying with analog read out gauge 222. As so far described, the present invention allows the implementation by welder B of waveform F. This waveform can be modified by a mouse or keyboard, subject to certain constraints at read out values 170, 172, 174, 176, 178 and 180, whereby the newly created or selectively modified waveform is implemented in a real time fashion by welder A.

The control application program in JAVA language used in Hsu U.S. Pat. No. 6,002,104 and in the present invention is illustrated in functional blocks in FIG. 3 where the start cycle block 201 allows an operator or welding engineer to select a desired prebuilt template A, as indicated by blocks 202. In the prior art the templates are fixed. Template A is loaded by line 204 into template manipulation block 211. Control parameters are directed from template manipulation block 211 through line 213 for control of the welding process at welder A in accordance with the actual template displayed on screen 150, as shown in FIG. 2. This is the control function of controller B, where welder A has a welding process determined by the ultimate waveform in block 211. When this monitor function is being implemented, the final controlling waveform is in a background window not visible on screen 150 of display 110. Read out value in devices or windows 170, 172, 174, 176, 178 and 180 are functionally manipulated as indicated by block 214 to changes the displayed read out values according to displayed waveform F. Block 214 is used to modify waveform F as previously described. Functional manipulation of waveform F by block 214 is input data on input/output line 216. Read out devices or windows 170, 172, 174, 176, 178 and 180 are multiplexed by multiplexer 221 so that the set value can be changed by entering an alpha numerical number as indicated by block 223. The scroll bar and control parameter locking device are operated by addressing the windows 190, 200, as previously described. Function block 230 indicates that spots or bars forming portions of waveform F can be moved by the data entry device 112, using functional program 232. Waveform F is reconstructed into the desired final configuration by action of manipulation subroutine of block 211 using information, or data, on line 216 and the interactive adjustment from functional subroutine 230. Values for windows 170, 172, 174, 176, 178 and 180 are outputted from block 211 on line 216.

Block 240 is the program for displaying the present waveform F, which has been edited or modified from an original waveform A to a new waveform N by the subroutine of block 211. Controller B executes the data or control parameters comprising the new waveform F. As indicated by functional block 242, a subroutine is provided wherein values of block 214 and movement of spots and bars by function subroutine of block 230 cannot change certain parameters of the waveform. For instance, background current 162 could not be greater than pinch start current 164. Such constraints are applied to functional block 211 for constricting manual manipulation as changes by read out devices 170, 172, 174, 176, 178 and 180 of waveform F. As indicated in the subroutine or functional subroutine 244, there are certain relational constraints which are also applied to certain control parameters. For instance, if the ratio in read out device or window 180 is locked at a set point, adjustment of the pinch current 156 will correspondingly adjust the peak current 160. The constraint subroutines indicated by functional blocks 242 and 244 are merely added program features used in the manual implementation of waveform F to a desired waveform for execution by welder A. As previously indicated, control parameters are directed to the welder A by line 213. Control parameters are read in real time, as indicated by functional block 250. The particular parameter being read and outputted, or executed, at any given time is selected in a sequence as indicated by functional block 260 at a rate determined by the rate of pulses on line 262. Executive program of block 270 executes the control parameters to duplicate waveform F as the welding process through controlling pulse width modulator 22 in accordance with standard switching technology.

Figure 4:
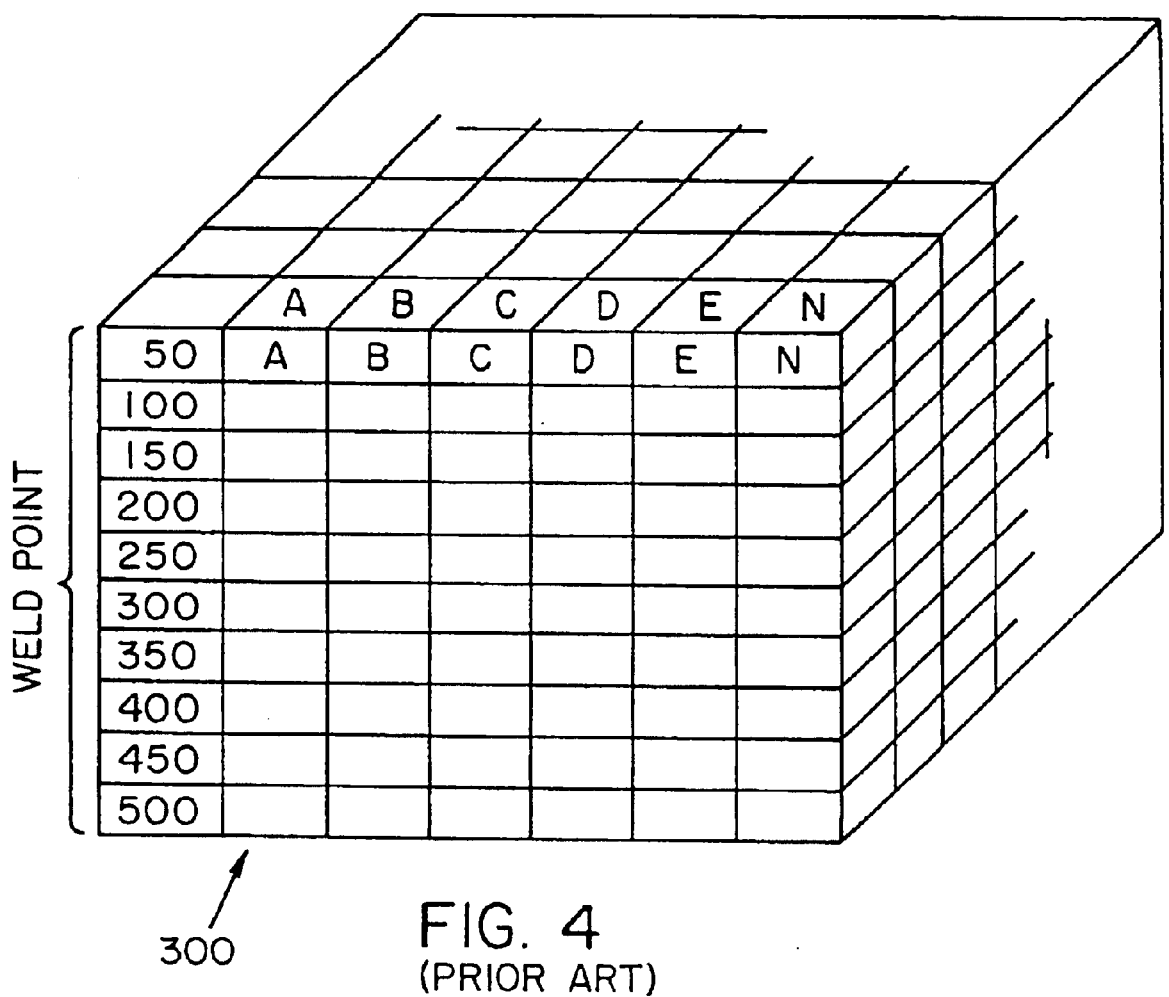
FIG. 4 is a schematic representation of a work point stack which is processed by using the present invention and includes parameters and waveform logic to control the welder.

Referring now to FIG. 4, data stack 300 includes the value of various parameters and is a part of the computer program and includes variable tables of parameters and the waveform logic to operator welder by the signal on line 56 to control pulse width modulator 22. This device converts DC bus to an output of the power supply tracing a desired waveform and dynamic behavior. The power supply can be an inverter or chopper, both of which are powered by input DC bus. Stack 300 also includes the parameter tables and waveform logic to control the welder with the waveform created on the GUI. A program determines where the data is located to be selected from the stack, where it is to be put or located in the graphic user interface displayed on CRT 150 as shown in FIG. 2. Waveform F is constructed by a program. In a like manner, the read out user variables of the GUI are controlled by a program. These two GUI components are specified in appropriate language. As previously described, the displayed waveform F, which is modified by interaction with the GUI by a keyboard or mouse 112. The modified waveform accomplished by the GUI is the waveform ultimately processed by electric arc welder A. The GUI program is a computer program that communicates data to and from stack 300.

Figure 5:
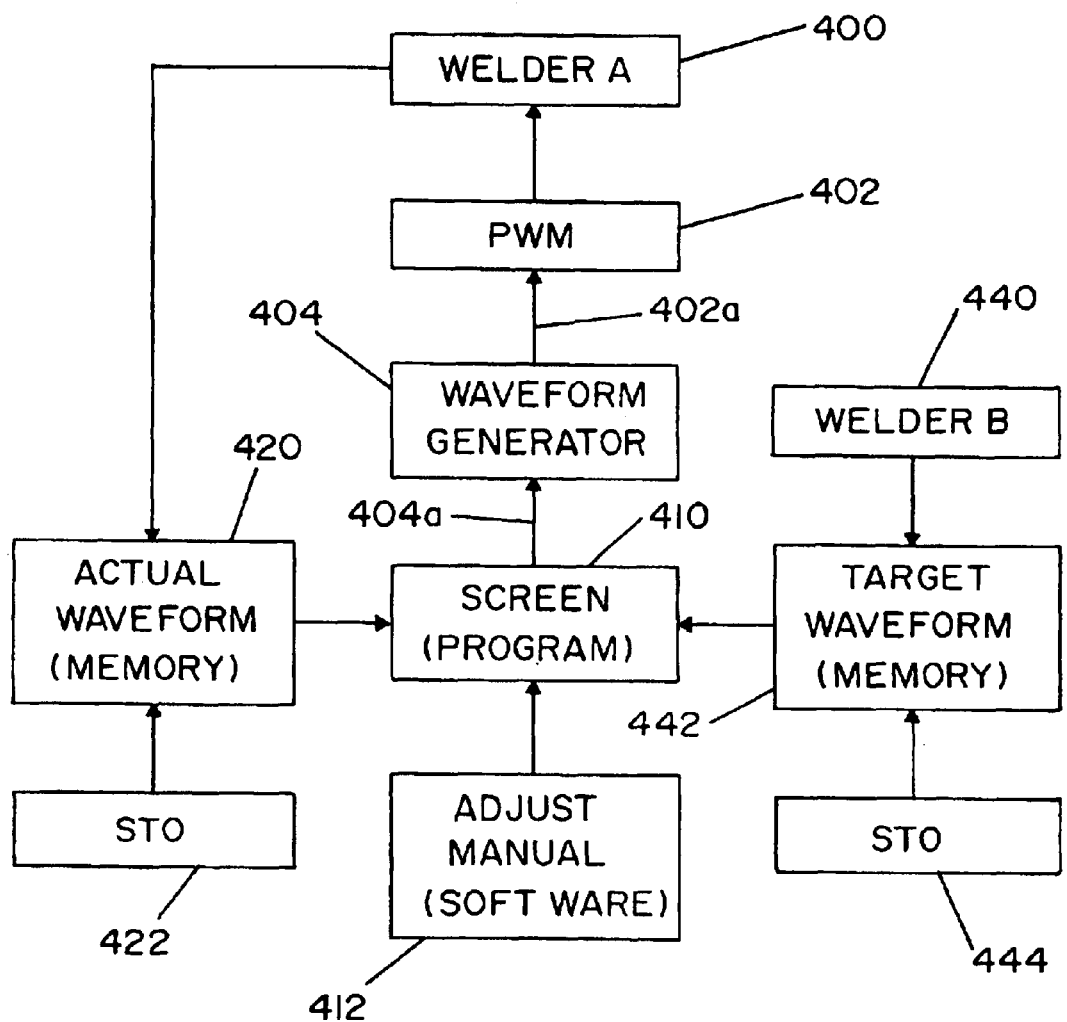
FIG. 5 is a block diagram illustrating the preferred embodiment of the present invention for customizing the commanded waveform in welder A to match the commanded waveform in welder B.

Referring now to FIG. 5, a block diagram and/or flow chart of the preferred embodiment is illustrated as controlling electric arc welder 400. The welder is a high speed switching inverter where the waveform outputted from the welder is controlled by a standard pulse width modulator 402 with an input 402a from a standard digitized waveform generator 404. The control signal in line 402a from generator 404 to pulse width modulator 402 is in accordance with the commanded waveform in line 404a from the display screen 410. The screen displays visual representation of digitized stored waveforms in accordance with standard technology. The screen 410 is referred to as a graphic user interface and has a CRT screen for displaying representations of the digitized waveforms processed in accordance with the invention. It is standard practice to have a graphic user interface 410 that displays the commanded waveform that is to be directed through line 404a to generator 404. In accordance with standard technology, the displayed digitized waveform is adjusted manually by a mouse and/or keyboard illustrated as device 412. As so far described, a commanded waveform is displayed on graphic user interface 410 at the display screen and is manually adjusted to have the desired shape. Thereafter, the commanded waveform, in digitized format, is directed to generator 404 to control the waveform of the weld process being performed by welder A. In accordance with the invention, and as will be described, screen 410 is used to customize the commanded waveform in accordance with standard practice; however, the customization operation is to cause the actual commanded waveform to match a desired waveform also displayed on the screen 410. In accordance with an option of the present invention, this customizing system and/or method can be done in a background program for the controller of the welder. In this embodiment, a display screen is not necessary. A stored desired digitized waveform and an actual commanded waveform are loaded into a program represented by block 410. Software as indicated by block 412 then modifies the commanded waveform that is to be outputted in line 404a in accordance with the desired waveform. This is done in a background program and need not be visually observed. Of course, it can be done by a background program and still be visually displayed on the screen 410.

In accordance with the invention, the desired waveform referred to as a target waveform is the actual waveform used in a remote welder B shown as block 440. Either the commanded waveform directed to the waveform generator in welder B or the actual sensed waveform during the operation of welder B is directed to memory 442 and is stored by a store function indicated as block 444. This stored digitized target waveform is directed to graphic user interface 410. In this manner, the commanded waveform displayed on screen 410 is customized manually to match the digitized target waveform from memory 442. Then, the commanded waveform is used by generator 404 to control the operation of welder A in accordance with the waveform obtained from welder B. Another aspect of the invention allows further customization of the commanded waveform in line 404a. In this modification, the actual waveform from welder 400 (welder A) is sensed and stored in memory 420 by the store function of block 422. In this manner, a single waveform is stored in both memory 420 and memory 442. The actual waveform stored in memory 420 is directed to screen 410 so that the commanded waveform in line 404a can be further customized using the actual waveform as compared to the target waveform. Thus, the actual waveform in memory 420 is customized and edited to match the target waveform from memory 442. Consequently, the commanded waveform in line 404a is adjusted so that the output of welder A matches the output of welder B.

Figure 6:
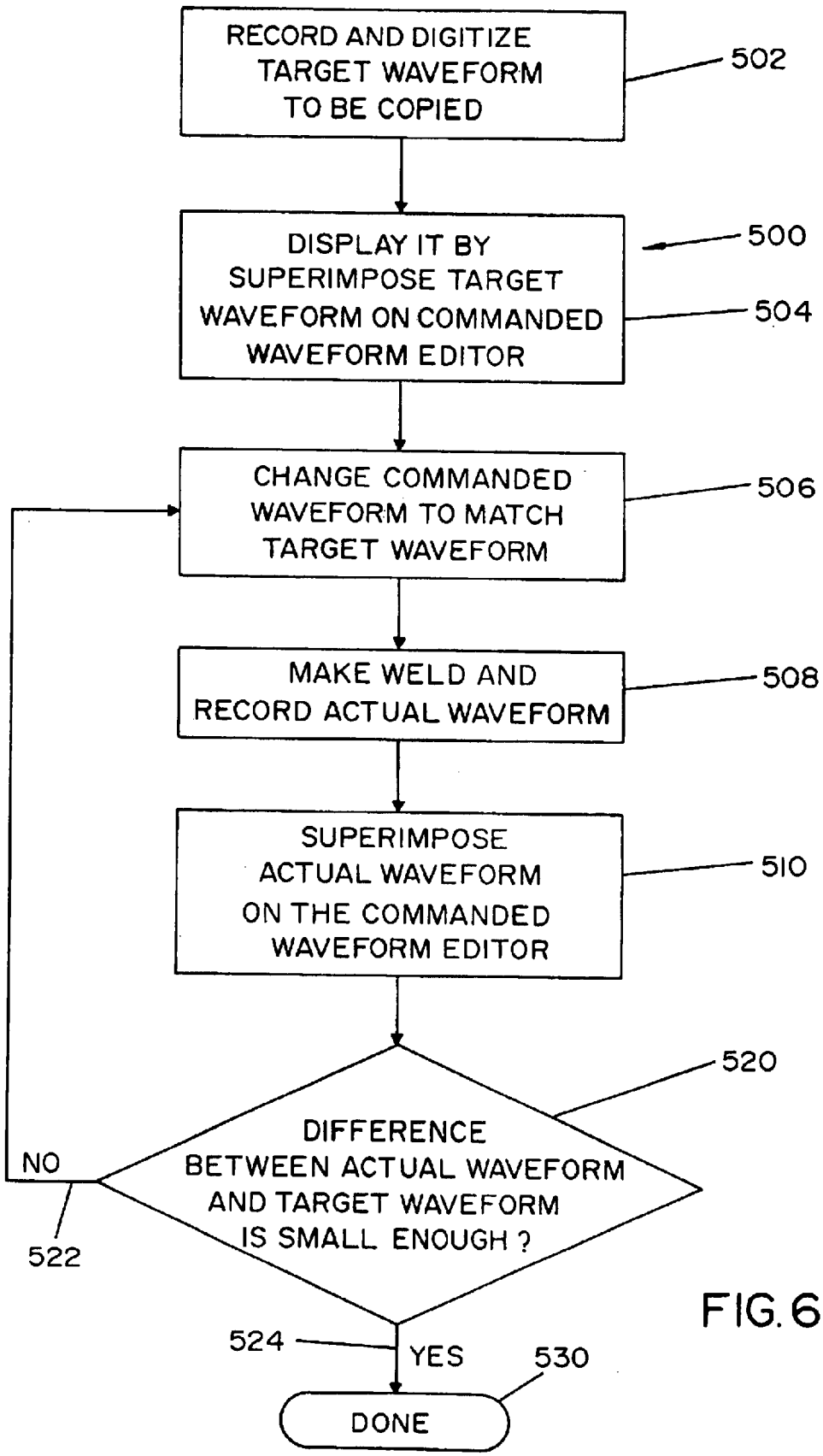
FIG. 6 is a flow chart of the computer program executed by the JAVA Virtual Machine or a generic computer to practice the preferred embodiment of the invention as shown in FIG. 5; and, FIG. 7 is a showing of the displayed digitized waveforms on the screen of a graphic user interface for manipulation and customizing in accordance with the present invention.

The computer program used to practice the invention is schematically illustrated in FIG. 6 wherein program 500 includes a step 502 for recording and digitizing a target waveform to be copied. This is the waveform stored in memory 442 of FIG. 5. Step 504 uses display screen 510 to superimpose the target waveform from memory 442 on the commanded waveform of editor 410. The editor displays the commanded waveform for line 404a. Thereafter, program 500 performs subroutine 506 that changes the commanded waveform to be outputted in line 404a to match the target waveform in memory 442. In this manner, welder 400 is operated by the customized commanded waveform. In the broadest aspect of the present invention the customized waveform by subroutine 506 causes the commanded waveform in line 404a to be close to and match the targeted waveform. This is the preferred embodiment of the invention.

To proceed further, the invention also involves the sensing of the actual weld being performed by welder 400. This is indicated by step 508 of program 500. The actual waveform is sensed and stored in memory 420. Thereafter, the actual waveform from memory 420 is superimposed on the commanded waveform in editor 410. At this stage of the computer program, the target waveform in memory 442 and the actual waveform from memory 420 are in and displayed by screen 410 of the graphic user interface. Then, step 420 of the program is performed. The actual waveform is compared to the target waveform. If there are substantial differences, line 522 is activated to again change the commanded waveform. If there are small differences, line 524 is activated to indicate that the program is completed and welding continues as represented by termination operation or step 530. In step 520, the objective is to match the actual waveform to the target waveform by changing the commanded waveform directed through line 404a to waveform generator 404.

Figure 7:
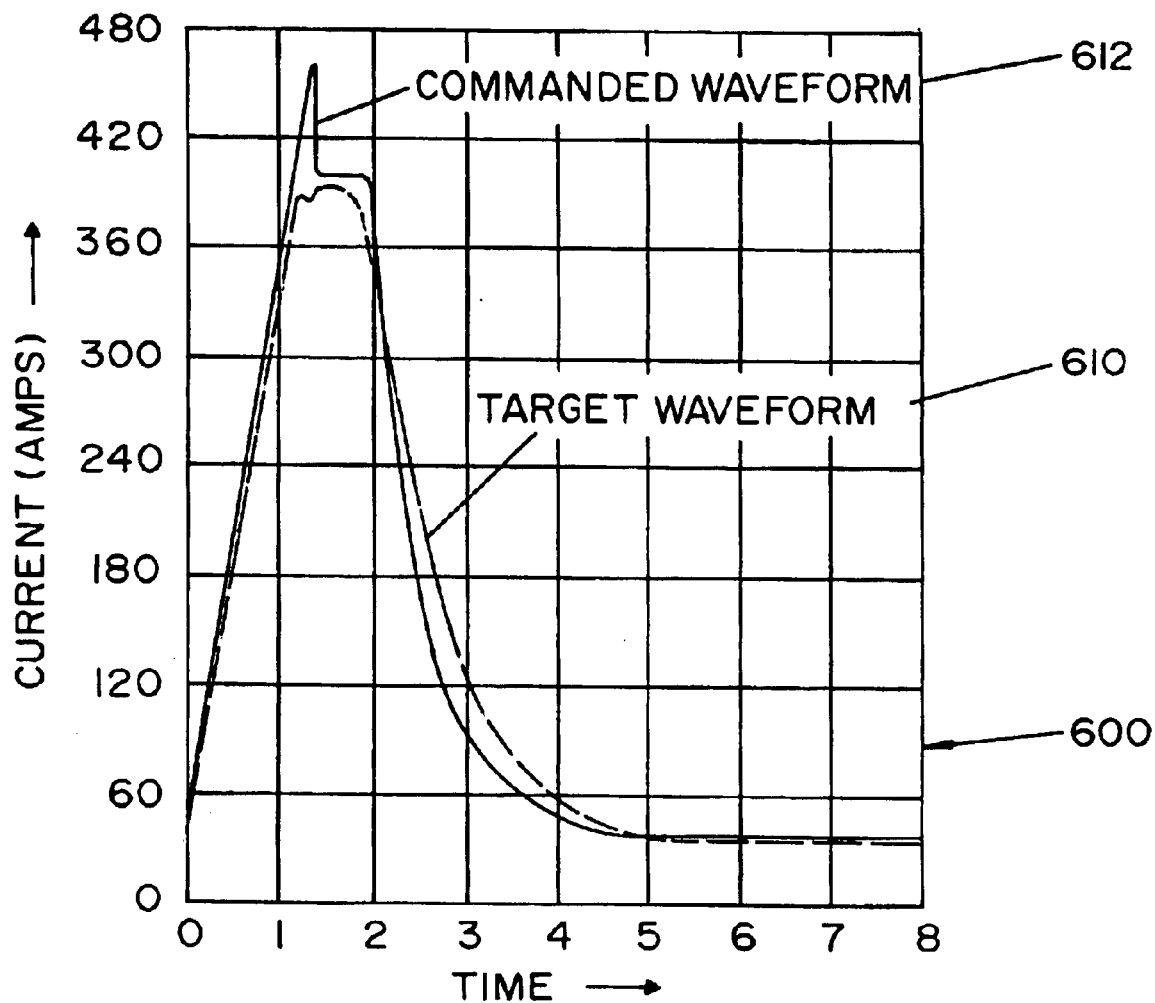

In the preferred embodiment, screen 410 displays the target waveform digitized and stored in memory 442 with the commanded waveform to be processed by generator 404 and appearing in line 404a. These two waveforms are shown in FIG. 7 wherein screen 600 of graphic user interface 410 displays target current waveform 610 and the commanded current waveform 612. Adjusting device 412 is used by the operator to adjust the commanded waveform which is the output of graphic user interface 410 so that this waveform matches the target waveform. Then welder 400 is operated by pulse width modulator 402 in accordance with the commanded waveform matching the target waveform. In the optional operation using the actual waveform from memory 420, the actual waveform is displayed on the screen 600. The commanded waveform 612 is adjusted so that the actual waveform matches the target waveform.

The invention is broadly the customization of a commanded waveform in line 404a directed to waveform generator 404 to match a desired waveform. The desired waveform is the actual waveform or the commanded waveform from a remote welder. As an option, the actual waveform is sensed and is used to further customize the commanded waveform for use in the welding operation. Other modifications could be made in this invention to accomplish the objective.

Having thus defined the invention, the following is claimed:

1. A system for creating an actual waveform at the output of an electric arc welder and caused by a waveform generator, said welder having a display and customizing screen to design a commanded waveform for processing by said waveform generator, said system includes a program to display a target waveform on said screen, a program to display the commanded waveform on said screen, a computer terminal to manually customize said commanded waveform to generally match said target waveform.

2. A system as defined in claim 1 including a sensor to sense the actual waveform, a program to display said actual waveform on said screen with said target waveform; then a program to change said actual waveform to match said target waveform; and, then a program using said changed actual waveform as said commanded waveform for said waveform generator.

3. A system as defined in claim 2 wherein said waveforms on said screen are stored in memory.

4. A system as defined in claim 3 wherein said target waveform is a waveform directed to the waveform generator of a remote welder.

5. A system as defined in claim 2 wherein said target waveform is a waveform directed to the waveform generator of a remote welder.

6. A system as defined in claim 2 including a pulse width modulator to cause said actual waveform created by use of said commanded waveform directed to and controlling said waveform generator.

7. A system as defined in claim 6 wherein said target waveform is a waveform directed to the waveform generator of a remote welder.

8. A system as defined in claim 1 wherein said waveforms on said screen are stored in memory.

9. A system as defined in claim) wherein said target waveform is a waveform directed to the waveform generator of a remote welder.

10. A system as defined in claim 1 wherein said target waveform is a waveform directed to the waveform generator of a remote welder.

11. A system as defined in claim 10 including a pulse width modulator to cause said actual waveform created by use of said commanded waveform directed to and controlling said waveform generator.

12. A system as defined in claim 11 including a sensor to sense the actual waveform, a program to load said actual waveform into a memory, a subroutine to change said actual waveform to match said target waveform and a subroutine to output said customized actual waveform as said commanded waveform.

13. A system as defined in claim 11 wherein said target waveform is a waveform directed to the waveform generator of a remote welder.

14. A system as defined in claim 1 including a pulse width modulator to cause said actual waveform created by use of said commanded waveform directed to and controlling said waveform generator.

15. A system for creating an actual waveform at the output of an electric arc welder and caused by a waveform generator, said welder including a program for designing a commanded waveform for controlling said waveform generator, said system comprises a device for loading a target waveform into memory for processing by said program; a device to store a commanded waveform in memory; a subroutine in said program to customize said commanded waveform to match said stored target waveform; and, a subroutine in said program to direct said customized commanded waveform to said waveform generator to cause said actual waveform.

16. A method for creating an actual waveform at the output of an electric welder and caused by a waveform generator, said welder having a display and customizing screen to design a commanded waveform for processing by said waveform generator, said method includes:
   (a) displaying a target waveform on said screen;
   (b) displaying the commanded waveform on said screen;
   (c) manually customizing said commanded waveform to generally match said target waveform; and,
   (d) then, welding with said commanded waveform directed to and controlling said waveform generator.

17. A method as defined in claim 16 including:
   (e) sensing the actual waveform;
   (f) displaying said actual waveform on said screen with said target waveform;
   (g) than changing said actual waveform to match said target waveform; and,
   (h) then using said changed actual waveform as said commanded waveform.

18. A method as defined in claim 17 wherein said target waveform is a waveform directed to the waveform generator of a remote welder.

19. A method as defined in claim 16 wherein said target waveform is a waveform directed to the waveform generator of a remote welder.

20. A method for creating an actual waveform at the output of an electric arc welder and caused by a waveform generator, said method including a program for designing a commanded waveform for controlling said waveform generator, said method comprises:
   (a) loading a target waveform into memory for processing by said program;
   (b) storing a commanded waveform in memory;
   (c) customizing said commanded waveform to match said stored target waveform; and,
   (d) directing said customized commanded waveform to said waveform generator to cause said actual waveform.

21. A method as defined in claim 20 including:
   (e) sensing the actual waveform;
   (f) loading said actual waveform into a memory;
   (g) changing said actual waveform to match said target waveform; and,
   (h) outputting said customized actual waveform as said commanded waveform.

22. A system as defined in claim 21 wherein said target waveform is a waveform directed to the waveform generator of a remote welder.

23. A system as defined in claim 20 wherein said target waveform is a waveform directed to the waveform generator of a remote welder.

* * * * *